US007890432B2

(12) United States Patent
Mattern

(10) Patent No.: US 7,890,432 B2
(45) Date of Patent: Feb. 15, 2011

(54) INFRASTRUCTURE WITH METER COMMUNICATION CAPABILITIES

(75) Inventor: James M. Mattern, Bethany, CT (US)

(73) Assignee: Neopost Technologies, Bagneux (FR)

( * ) Notice: Subject to any disclaimer, the term of this patent is extended or adjusted under 35 U.S.C. 154(b) by 1101 days.

(21) Appl. No.: 11/047,513

(22) Filed: Jan. 31, 2005

(65) Prior Publication Data

US 2006/0173800 A1 Aug. 3, 2006

(51) Int. Cl.
*G06F 17/00* (2006.01)
*G07B 17/02* (2006.01)

(52) U.S. Cl. ........................................ 705/61; 705/401

(58) Field of Classification Search ......... 705/401–412, 705/61

See application file for complete search history.

(56) References Cited

U.S. PATENT DOCUMENTS 5,008,827 A * 4/1991 Sansone et al. ............. 705/409
6,141,683 A * 10/2000 Kraml et al. ................ 709/220
6,711,137 B1 * 3/2004 Klassen et al. .............. 370/252
2002/0078218 A1 * 6/2002 Feig ........................... 709/231
2002/0107743 A1 * 8/2002 Sagawa ....................... 705/17

OTHER PUBLICATIONS

FP Mailing Solutions—Postage Meter FAQ's http://web.archive.org/web/20020802023234/http://fpusa.net/postagemeters.cfm.*
What is a microcomputer?—A Word Definition from Webopedia Computer Dictionary http://webopedia.com/TERM/m/microcomputer.html.*
FP Mailing Solutions—Postage Meter FAQ's; web page archived by archive.org, on Aug. 2, 2002. http://web.archive.org/web/20020802023234/http://fpusa.net/postagemeters.cfm.*

* cited by examiner

*Primary Examiner*—John W Hayes
*Assistant Examiner*—Allen J Jung
(74) *Attorney, Agent, or Firm*—Townsend and Townsend and Crew LLP

(57) ABSTRACT

A system for providing franking services includes one or more networks, one or more postage meters, and a postal infrastructure data center connected to the one or more meters through the one or more networks, wherein the postal infrastructure data center establishes communication with the one or more meters as required.

23 Claims, 4 Drawing Sheets

INFRASTRUCTURE WITH METER COMMUNICATION CAPABILITIES

BACKGROUND OF THE INVENTION

The present invention relates to a postal service infrastructure that initiates communication with one or more meters.

BRIEF DESCRIPTION OF RELATED DEVELOPMENTS

A high volume postal customer may use a meter which incorporates a Postal Security Device (PSD) to secure the proof of payment of postal indicia. In an exemplary application, indicia may be applied to mailing items that identifies the value of the postage applied and other information. A customer may purchase postage and the purchased value may be stored in the PSD. As the postage indicia is applied to items, the value applied may be deducted from the stored value. Once postage indicia is applied, the item may then be dropped into the collection stream of the particular postal system and subsequently processed for delivery.

In various countries, for example the United States, postal meters may communicate with a remote data center to exchange information related to customer usage and funding for billing purposes and to have postage funds replenished. In the United States, a postal customer generally may add postage to the meter in two ways. The first is to physically take the meter to the postal authority, generally referred to herein as "the post," where postage is purchased and added to the PSD. The second is to remotely add postage over a network, for example, a telephone line with a modem, or the Internet, where the added postage is deducted from an account usually maintained with a meter vendor or a trusted third party administrator, for example, a financial institution. In this case, customer or postal authority access to a meter's accounting system or memory system generally is not possible. Meters with this type of communication capability generally communicate with a data center in a postal service infrastructure where the meter initiates communication.

It would be advantageous for the data center to have the ability to initiate communication with one or meters that are part of the infrastructure.

SUMMARY OF THE EXEMPLARY EMBODIMENTS

A system for providing franking services includes one or more networks, one or more postage meters, and a postal infrastructure data center connected to the one or more meters through the one or more networks, wherein the postal infrastructure data center establishes communication with the one or more meters as required.

In accordance with an exemplary embodiment, a postage meter for providing franking services includes a communications port for effecting communicating with a postal infrastructure data center and a microprocessor connected to the communications port, the microprocessor being responsive to communications received from the postal infrastructure data center. The postal infrastructure data center initiates the communication between the postage meter and the postal infrastructure data center as required.

In accordance with an exemplary embodiment, a postal infrastructure data center for providing franking services includes a server and communications circuitry connected to the server for effecting communication with one or more postage meters. The postal infrastructure data center is configured to initiate data exchange with the one or more postage meters through the one or more networks as required.

In accordance with an exemplary embodiment, a method for establishing communications with a postage meter where a postal infrastructure data center initiates the communications is provided. The method includes identifying one or more networks, selecting at least one of the one or more networks, establishing a connection to the selected one or more networks, identifying at least one of the one or more meters connected to the one or more networks and establishing a first connection to the at least one of the one or more meters for an exchange of data between the postal infrastructure data center and the at least one of the one or more meters.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENTS

Figure 1:
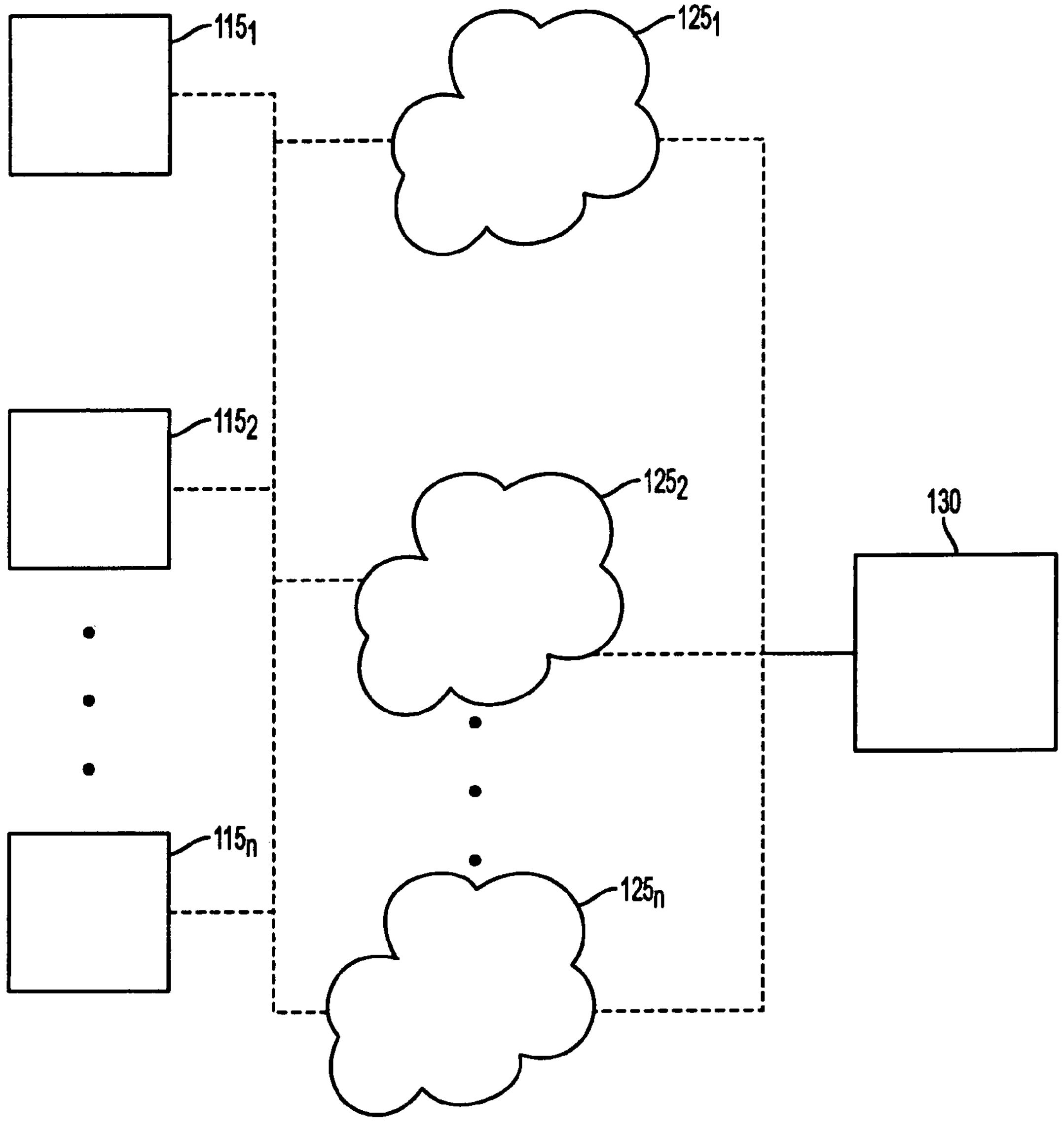
FIG. 1 shows a block diagram of a system suitable for practicing the disclosed embodiments.

FIG. 1 shows a block diagram of a system 100 suitable for practicing the disclosed embodiments disclosed herein. Although the disclosed embodiments will be described with reference to the embodiment shown in the drawings, it should be understood that the disclosed embodiments can be embodied in many alternate forms of embodiments. In addition, any suitable size, shape or type of elements or materials could be used.

System 100 includes one or more funding devices, shown in FIG. 1 as meters $\mathbf{115}_1 \ldots \mathbf{115}_n$ and a postal infrastructure data center 130 connected to the meters $\mathbf{115}_1 \ldots \mathbf{115}_n$ through one or more networks $\mathbf{125}_1 \ldots \mathbf{125}_n$.

It is a feature of the disclosed embodiments for the postal infrastructure data center 130 to initiate communication with one or more of the meters $\mathbf{115}_1 \ldots \mathbf{115}_n$ as required.

Figure 2:
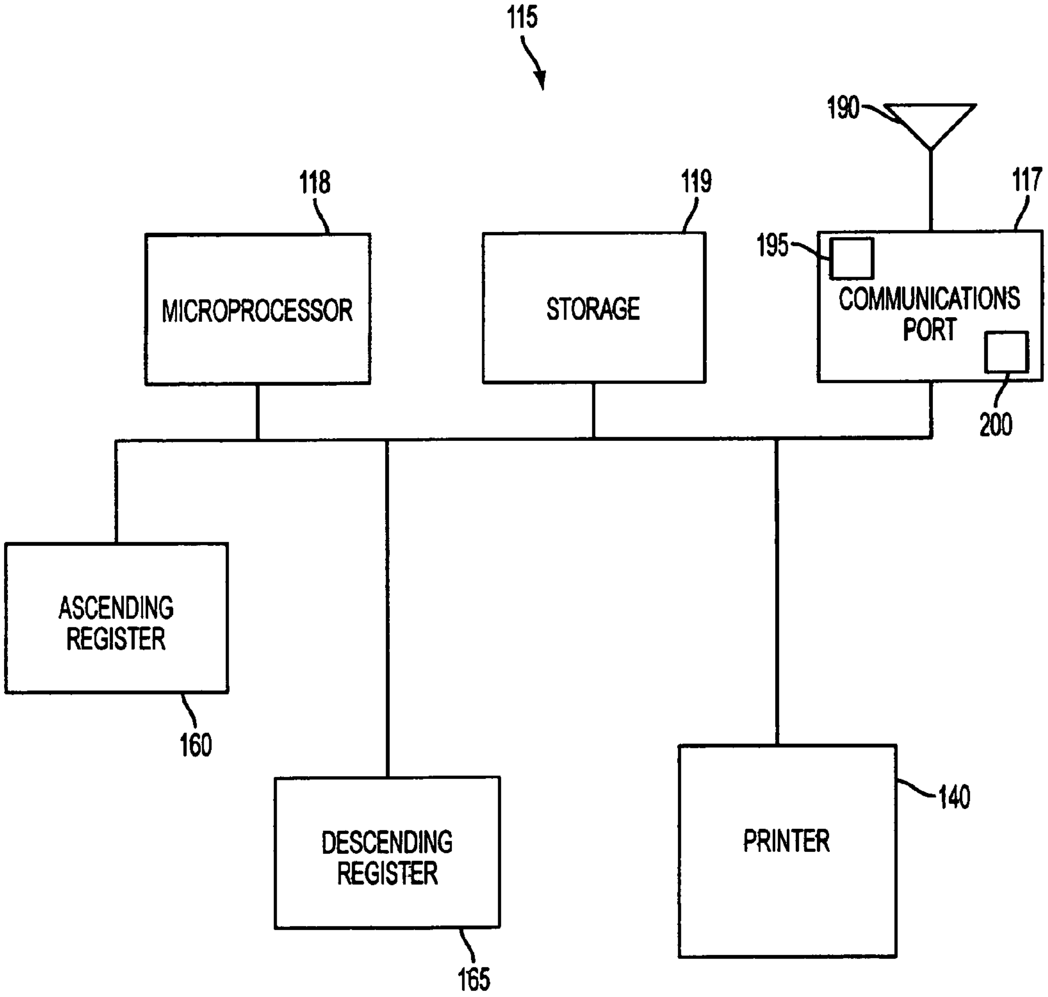
FIG. 2 shows a block diagram of a meter according to the disclosed embodiments.

FIG. 2 shows a general block diagram of meter 115. Meter 115 may include a communications port 117 and a microprocessor 118 for performing electronic accounting functions, control functions, and franking functions according to programs stored in a storage device 119. Some of these functions or subsets of these functions may be grouped within a secure perimeter as what is commonly referred to as a Postal Security Device (PSD).

Storage device 119 generally stores machine readable program code which is adapted to cause microprocessor 118 to perform the functions of the disclosed embodiments. Storage device 119 may utilize optical, magnetic, semiconductor, electronic, or other types of suitable devices to store the program code.

Microprocessor 118 typically performs the electronic accounting functions in relation to franking items. Data associated with the accounting functions may include an accumulated total value of credit entered into the PSD, an accumulated total value of charges dispensed by the PSD by franking items, a count of the number of items franked, and a count of the number of items franked with a charge in excess of a predetermined value. The accumulated total value of credit may be stored in an ascending credit register 160, the accumulated total value of postage charges dispensed may be stored in a descending register 165, and the count of items may be stored in an items count register 170. The various registers may be located in storage device 119.

The franking functions performed by microprocessor 118 typically include providing an indication, funds, or other authorization to produce indicia, and reporting the number of items, value marked and other parameters to the accounting functions. Such indication, funds, or other authorization are referred to herein as indicia services.

The meter 115 generally provides indicia services locally utilizing a printer 140 and may be capable of franking a label, directly franking a mail piece, or franking any other suitable substrate. Meter 115 is advantageous in that a user may place meter 115 in a specific location on or over a substrate and frank or print an object. Meter 115 may be capable of printing stamps, barcodes, addresses, planet codes, images, text, indicia, logos, graphics, or any other printable item in any desired order. For example, the user may be able to position meter 115 to print a return address, and then position meter 115 to print a mailing address, and then to print postage.

The printer 140 may be capable of printing on any suitable substrate or media, including an adhesive or tacky substrate, and may also be capable of applying a covering over the printed items. For example, the printer 140 may be capable of applying a film or coating over a printed item for protection or to prevent tampering.

The printer 140 may be an inkjet, dye sublimation, thermal wax, laser, electrostatic, xerographic, thermal, RF, or any suitable type of printer. In one embodiment, printer 140 may utilize energy beams, having high or low power, for example, RF beams, to print directly onto a substrate.

The control functions performed by microprocessor 118 may include utilizing communications port 117 to communicate with the postal infrastructure data center 130. Communications port 117 generally includes an antenna 190 and support circuitry 195 or other signaling devices 200 for communicating with the postal infrastructure data center 130 through the one or more networks $\mathbf{125}_1 \ldots \mathbf{125}_n$.

The signaling devices 200 may provide an air interface, a wired interface, a wireless interface, or an electrical, electromagnetic, radio, infrared, or other suitable facility for communication. The support circuitry 195 may also include location determining circuitry, for example, a GPS facility for determining the location of the meter 115.

The postal infrastructure data center 130 generally has the capability to access one or more of the meters $\mathbf{115}_1 \ldots \mathbf{115}_n$ to exchange information as required. For example, the postal infrastructure data center 130 may access meters $\mathbf{115}_1 \ldots \mathbf{115}_n$ to download additional features, updates, upgrades, programs, diagnostic functions, delivery confirmation or other types of information. The postal infrastructure data center 130 may access meters $\mathbf{115}_1 \ldots \mathbf{115}_n$ to retrieve information including accounting data, status data, etc.

In one embodiment, communication between meters $\mathbf{115}_1 \ldots \mathbf{115}_n$ and the postal infrastructure data center 130 may be wireless. In other embodiments, the communication may occur through a combination of wireless and wired connections, or only wired connections.

Postal infrastructure data center 130 may initiate a data exchange by initially detecting the one or more communications networks $\mathbf{125}_1 \ldots \mathbf{125}_n$ suitable for the data exchange. Postal infrastructure data center 130 may logon or establish a connection to a particular communications network 125 by addressing a message specifically to that communications network. Alternately, Postal infrastructure data center 130 may identify that one or more communications networks $\mathbf{125}_1 \ldots \mathbf{125}_n$ are available for providing communications and may perform a selection process among the available communications networks $\mathbf{125}_1 \ldots \mathbf{125}_n$ (Blocks 401 and 402, FIG. 4). For example, postal infrastructure data center 130 may broadcast polling or paging signals in attempt to receive a response from a communication network. In the event that more than one communication network responds, meter 115 may select a responding network based on any combination of signal strength, quality of service, connection speed, cost, etc.

Communication networks $\mathbf{125}_1 \ldots \mathbf{125}_n$ may include any suitable communications network, for example, the Public Switched Telephone Network (PSTN), a wireless network, a wired network, a Local Area Network (LAN), a Wide Area Network (WAN), virtual private network (VPN), an air interface, etc. The air interface may include any suitable wireless communication protocols or signaling techniques or standards, for example TDMA, CDMA, IEEE 802.11, the BLUETOOTH wireless standard, close range RF, optical, any appropriate satellite communication standards, etc.

In one embodiment, postal infrastructure data center 130 may utilize cell communication technology and identify a cellular communication network from the one or more networks $\mathbf{125}_1 \ldots \mathbf{125}_n$ using roaming techniques.

Figure 4:
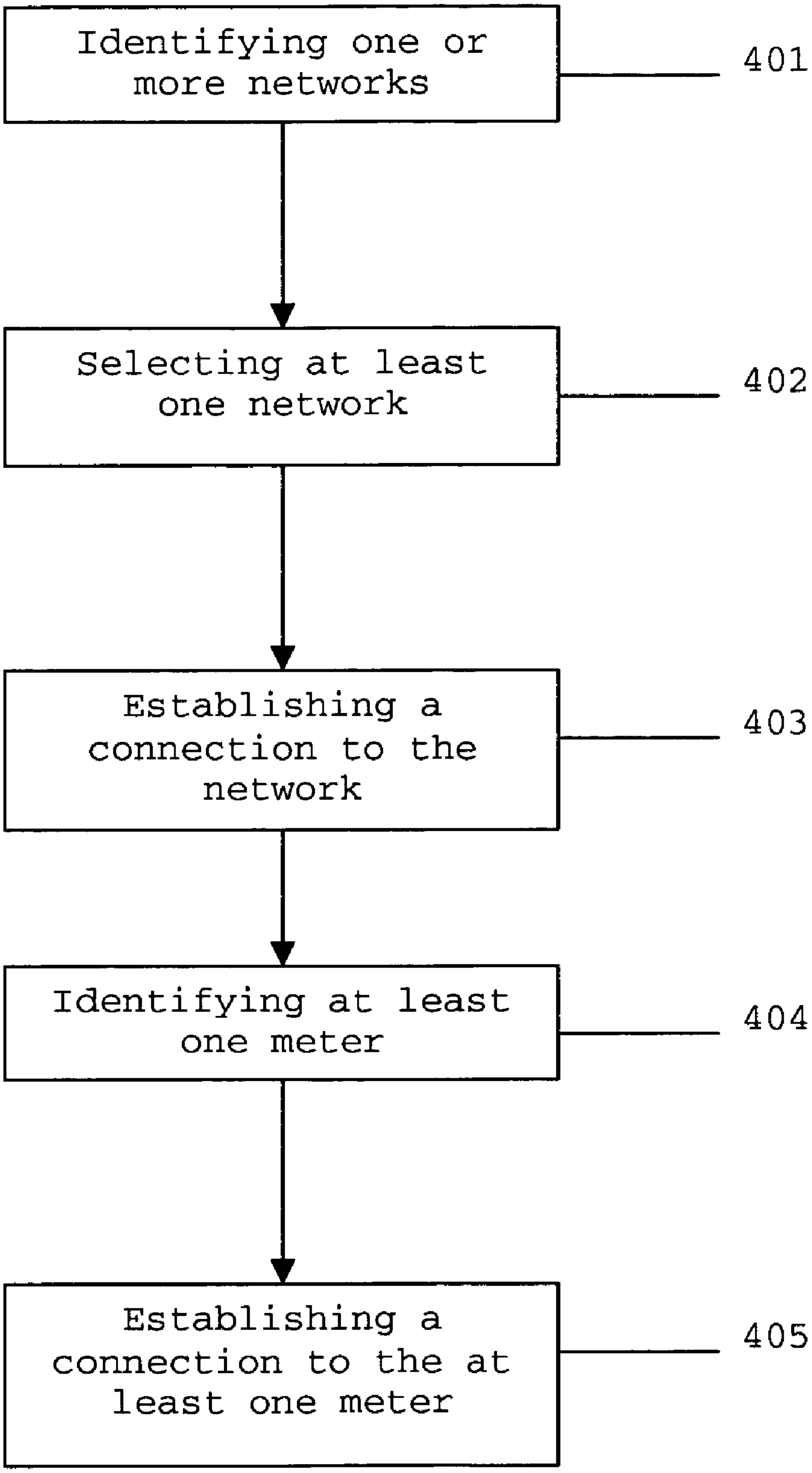
FIG. 4 shows a flow diagram in accordance with a method of an exemplary embodiment.

After postal infrastructure data center 130 has established a connection with an appropriate communication network 125, postal infrastructure data center 130 then attempts to logon or establish a connection to one or more meters $\mathbf{115}_1 \ldots \mathbf{115}_n$ (Blocks 403 and 405, FIG. 4). Postal infrastructure data center 130 may attempt to connect to an individual meter 115 by addressing a message specifically to that meter 115. Alternately, postal infrastructure data center 130 may identify that one or more meters $\mathbf{115}_1 \ldots \mathbf{115}_n$ are available for communication (Block 404, FIG. 4).

For example, postal infrastructure data center 130 may attempt to identify any meters $\mathbf{115}_1 \ldots \mathbf{115}_n$ connected to networks $\mathbf{125}_1 \ldots \mathbf{125}_n$, for example by polling network addresses or other identification techniques. Postal infrastructure data center 130 may also attempt to identify meters $\mathbf{115}_1 \ldots \mathbf{115}_n$ by broadcasting a paging signal or other type of signal that requests a response. In an embodiment using cell communication technology, postal infrastructure data center 130 may place a call to one or more meters $\mathbf{115}_1 \ldots \mathbf{115}_n$.

Postal infrastructure data center 130 may be capable of establishing more than one connection to a particular meter 115 and may be capable of establishing a connection to more than one meter $\mathbf{115}_1 \ldots \mathbf{115}_n$ simultaneously. For example, postal infrastructure data center 130 may establish a first connection to a first meter $\mathbf{115}_1$ for fund replenishment and, during the first connection, may establish a second connection to the first meter $\mathbf{115}_1$ to download data tables. As another example, postal infrastructure data center 130 may establish a first connection to a first meter $\mathbf{115}_1$ for fund replenishment and, during the first connection, may establish a second connection to a second meter $\mathbf{115}_2$ to download data tables.

Figure 3:
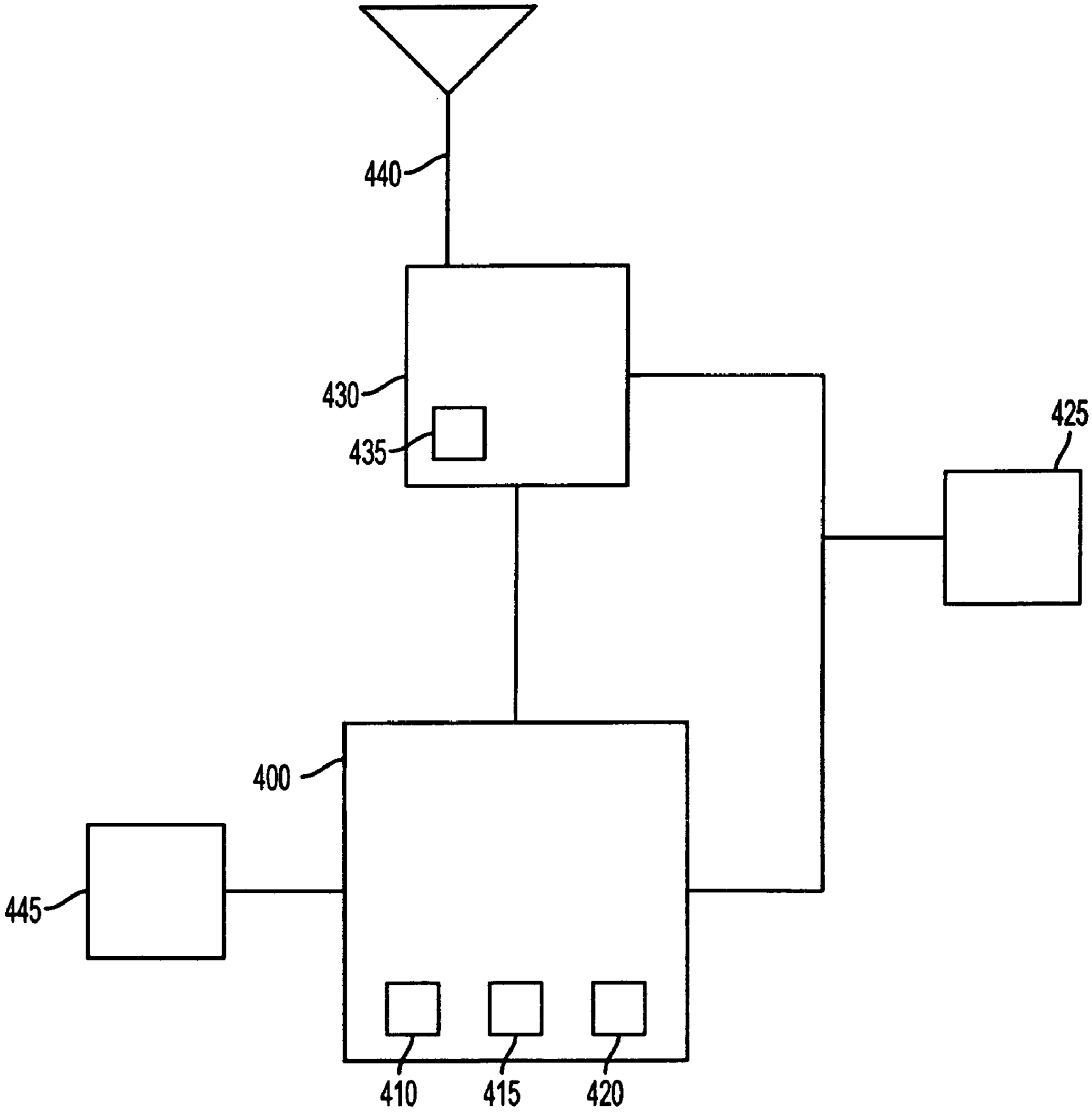
FIG. 3 shows a diagram of a postage infrastructure data center.

Referring to FIG. 3, the postal infrastructure data center 130 may generally include a server 400, several data bases 410, 415, 420, a power facility 425, for example, a power distribution network, and communication circuitry 430. Communication circuitry 430 may include an antenna 440 and other circuitry and devices 435 for communication with meters $\mathbf{115}_1$ . . . $\mathbf{115}_n$ through the one or more networks $\mathbf{125}_1$ . . . $\mathbf{125}_n$.

In other embodiments, devices 435 may include suitable circuitry, programs, transmitters and receivers for any appropriate type of wireless communication utilizing radio frequency (RF), infrared (IR), optical, acoustical, any type of electromagnetic based technology, or any other type of wireless communication. The postal infrastructure data center 130 may also include a user interface facility 445 which may provide local users with access to postal infrastructure data center services.

It should be understood that the foregoing description is only illustrative of the disclosed embodiments. Various alternatives and modifications can be devised by those skilled in the art without departing from the disclosed embodiments. Accordingly, the disclosed embodiments are intended to embrace all such alternatives, modifications and variances which fall within the scope of the appended claims.

What is claimed is:

1. A method for establishing communications with a postage meter comprising:

identifying a plurality of networks concurrently connected to a postal infrastructure data center and usable by the postal infrastructure data center to communicate with postage meters, each of the plurality of networks being of a different network type, each network having a plurality of postage meters connected to the network;

selecting, by the postal infrastructure data center, at least one of the plurality of networks based on a selection criterion applied to each of the plurality of networks;

establishing an active connection to the selected at least one network;

subsequent to establishing the connection to the selected at least one network, polling the plurality of meters to identify at least one of the plurality of meters connected to the selected at least one network to be serviced by the data center;

subsequent to identifying the at least one meter, establishing a first connection to the at least one meter for an exchange of data between the postal infrastructure data center and the at least one meter, the first connection being established at the initiation of a postal infrastructure data center; and subsequent to establishing the first connection to the at least one meter, servicing the at least one meter by the data center.

2. The method of claim 1, wherein a connection to the at least one of the one or more meters occurs simultaneously with a connection to another one of the one or more meters.

3. The method of claim 1, further comprising establishing a second connection to the at least one meter simultaneously with the first connection.

4. The method of claim 1, wherein identifying the plurality of networks includes addressing a message to each of the plurality of networks.

5. The method of claim 1, wherein identifying the plurality of networks includes broadcasting polling or paging signals to each of the plurality of networks.

6. The method of claim 1, wherein identifying the at least one meter includes addressing a message to the one or more postage meters.

7. The method of claim 1, wherein identifying the at least one meter includes broadcasting polling or paging signals to the one or more postage meters.

8. The method of claim 1, wherein the selection criterion is at least one of: the signal strength of the network, the quality of service of the network, the connection speed of the network, and the cost of the network.

9. The method of claim 1, wherein each of the plurality of networks is of a network type selected from the group consisting of: the Public Switched Telephone Network, a Local Area Network, a Wide Area Network, and a Virtual Private Network.

10. The method of claim 1, wherein each of the plurality of networks is of a network type selected from the group consisting of: a wired network, a cellular network, a wireless network using a communication protocol based on an IEEE 802.11 standard, and a satellite-based communication network.

11. The method of claim 1, wherein the selected at least one network includes a wireless network.

12. The method of claim 1, wherein the selected at least one network includes a cellular network.

13. The method of claim 1, wherein the at least one selected meter to be serviced by the data center is connected to the data center by two or more of the plurality of networks.

14. The method of claim 1, wherein servicing the at least one meter comprises providing rate updates to the meter, receiving postage data from the meter, or a combination thereof.

15. A method of providing postal meter service from a postal infrastructure data center, comprising:

identifying a plurality of networks concurrently connected to a postal infrastructure data center and suitable for communication with a first postal meter, each of the plurality of networks being of a different network type, each network having a plurality of postage meters connected to the network;

selecting one of the plurality of networks by the postal infrastructure data center;

establishing an active connection to the selected network;

subsequent to connecting to the selected network, polling the plurality of meters to identify the first postal meter from among the plurality of postal meters to be serviced by the data center;

subsequent to identifying the first postal meter, initiating communication with the first postal meter over the selected network;

subsequent to initiating communication with the first postal meter, servicing the first postal meter;

initiating communication with a second postal meter from among the plurality of postal meters; and servicing the second postal meter prior to completing the servicing of the first postal meter;

wherein communication between the postal infrastructure data center and each of the postal meters is initiated by the postal infrastructure data center.

16. The method of claim 15, wherein communicating with the second postal meter further comprises communicating with the second postal meter over the selected network.

17. The method of claim 15, wherein communicating with the second postal meter further comprises:

selecting a second of the plurality of networks;

establishing an active connection to the second network; and initiating communication with the second postal meter over the second network.

18. The method of claim 15, wherein each of the plurality of networks is of a network type selected from the group consisting of: the Public Switched Telephone Network, a Local Area Network, a Wide Area Network, and a Virtual Private Network.

19. The method of claim 15, wherein each of the plurality of networks is of a network type selected from the group consisting of: a wired network, a cellular network, a wireless network using a communication protocol based on an IEEE 802.11 standard, and a satellite-based communication network.

20. The method of claim 15, wherein the selected network is a wireless network.

21. The method of claim 15, wherein the selected network is a cellular network.

22. The method of claim 15, wherein the first meter is connected to the data center by two or more of the plurality of networks.

23. The method of claim 15, wherein servicing the first meter comprises providing rate updates to the meter, receiving postage data from the meter, or a combination thereof.

* * * * *